Jan. 13, 1970      E. M. HUNT      3,489,398
WELDING ROD HANDLING AND BAKING SYSTEM
Filed June 27, 1968      5 Sheets-Sheet 1
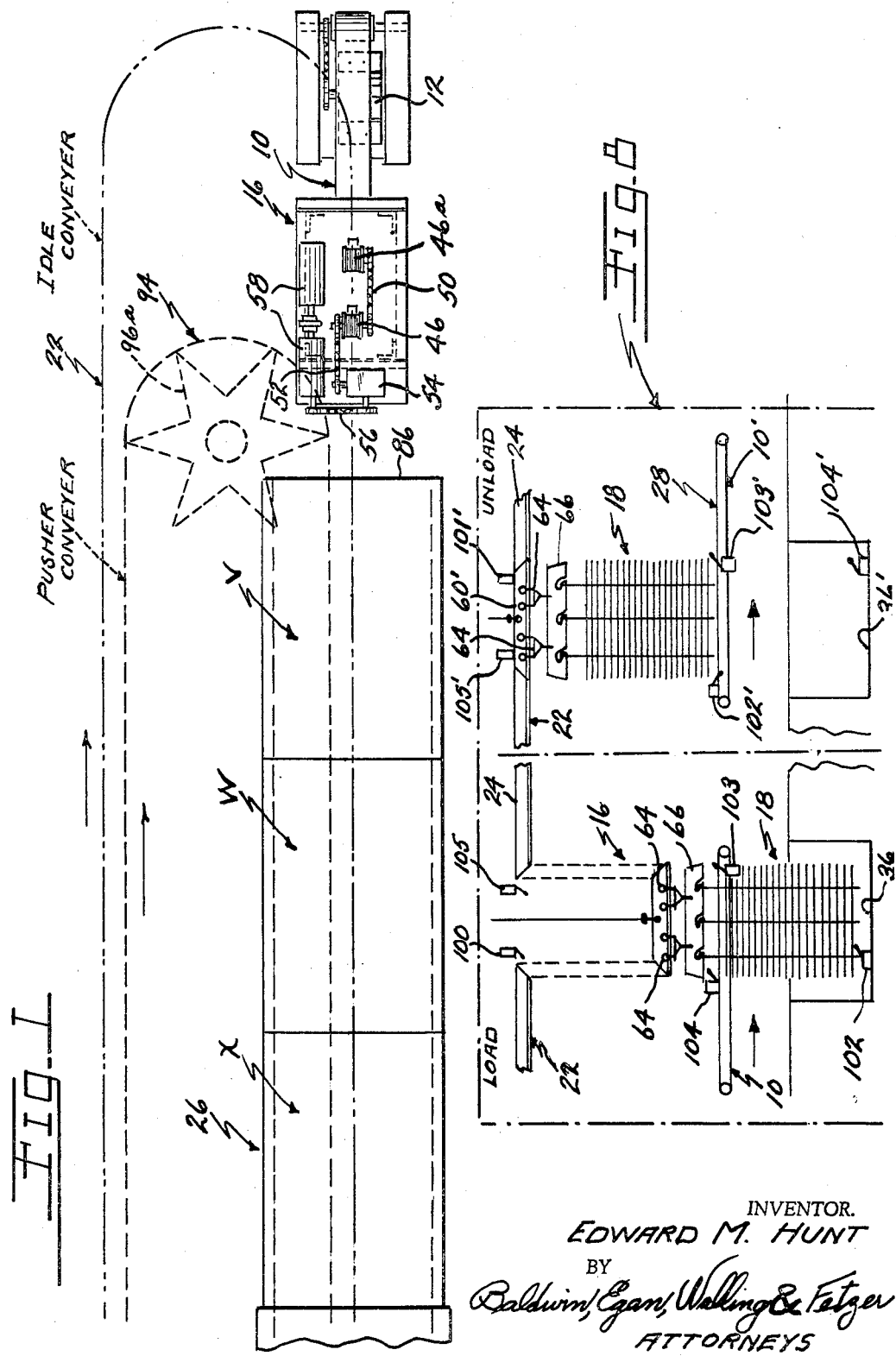
INVENTOR.
EDWARD M. HUNT
BY
Baldwin, Egan, Walling & Fetzer
ATTORNEYS

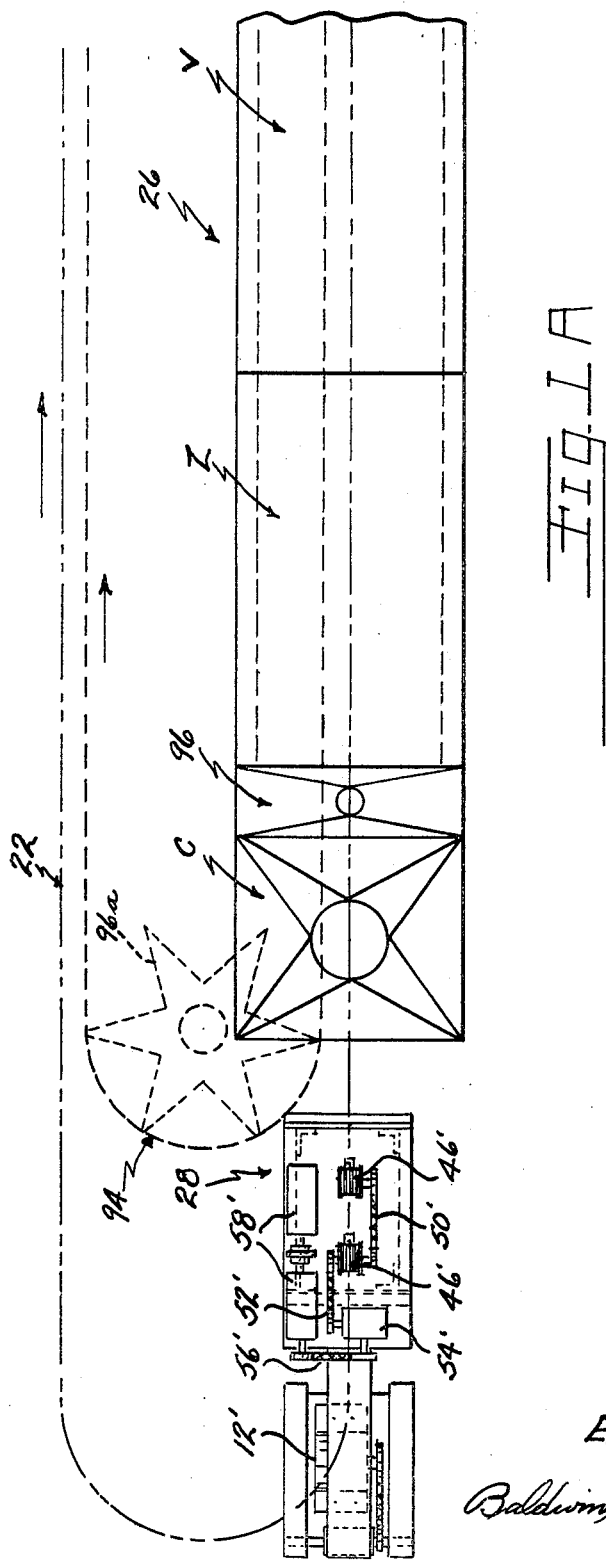

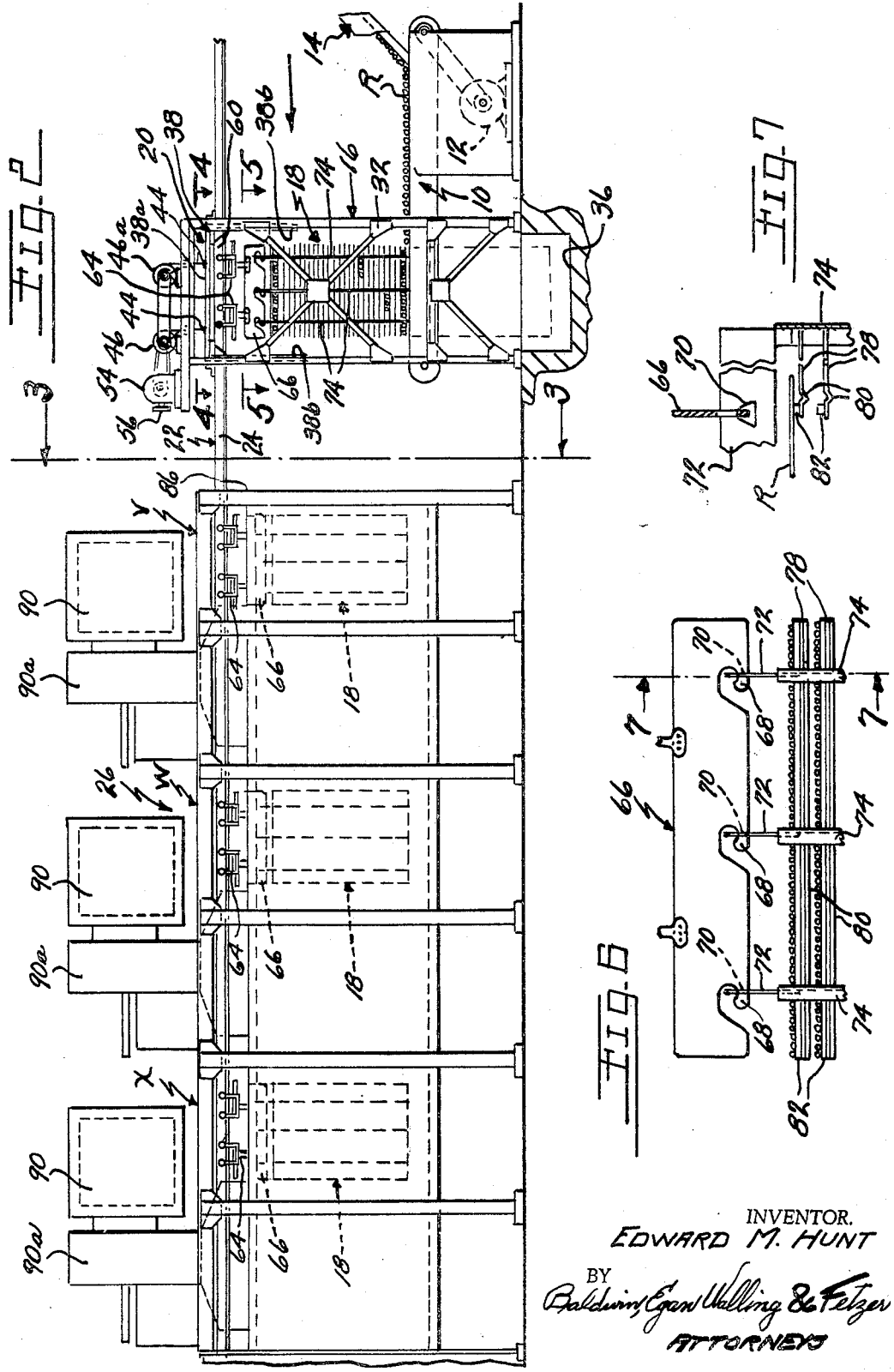

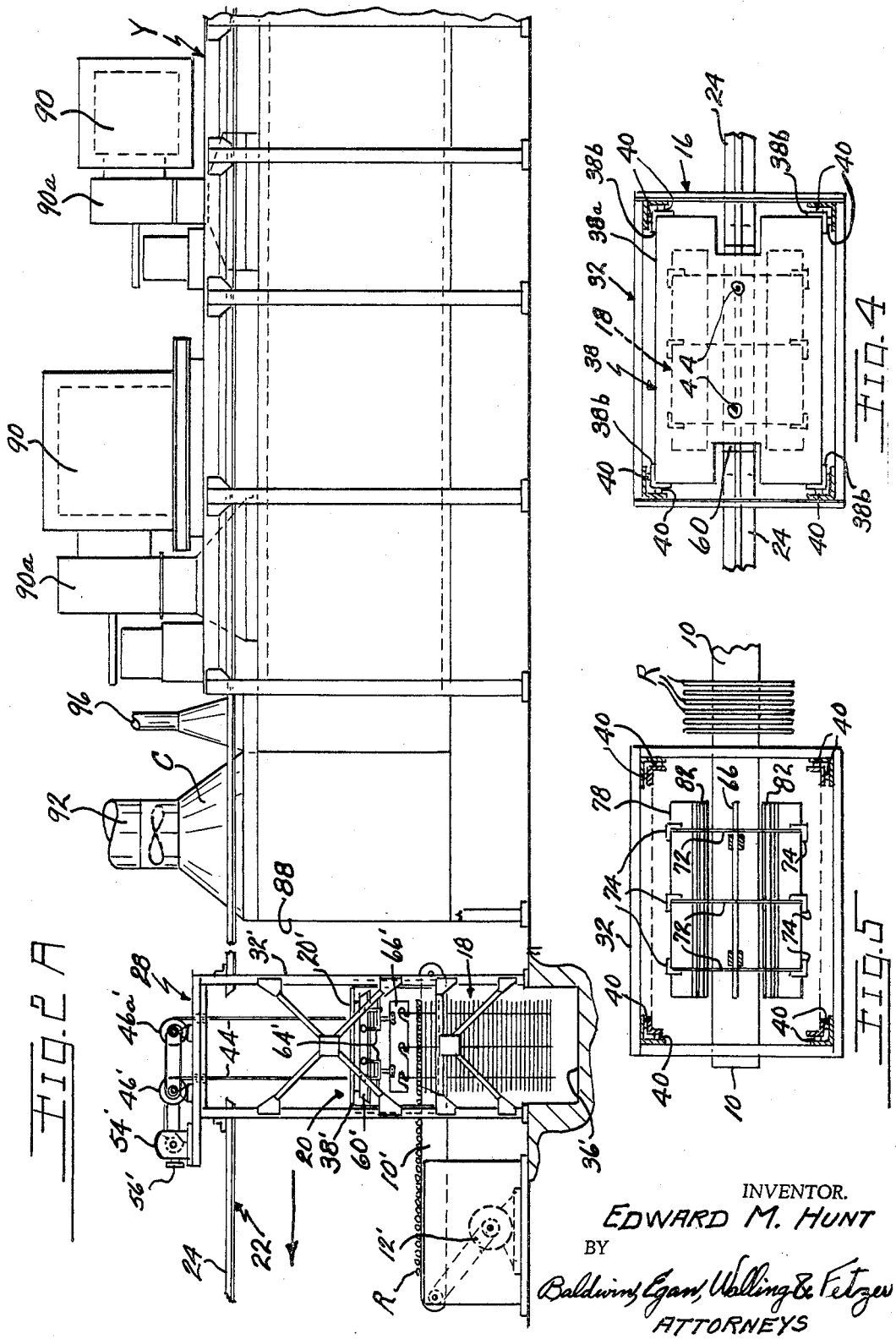

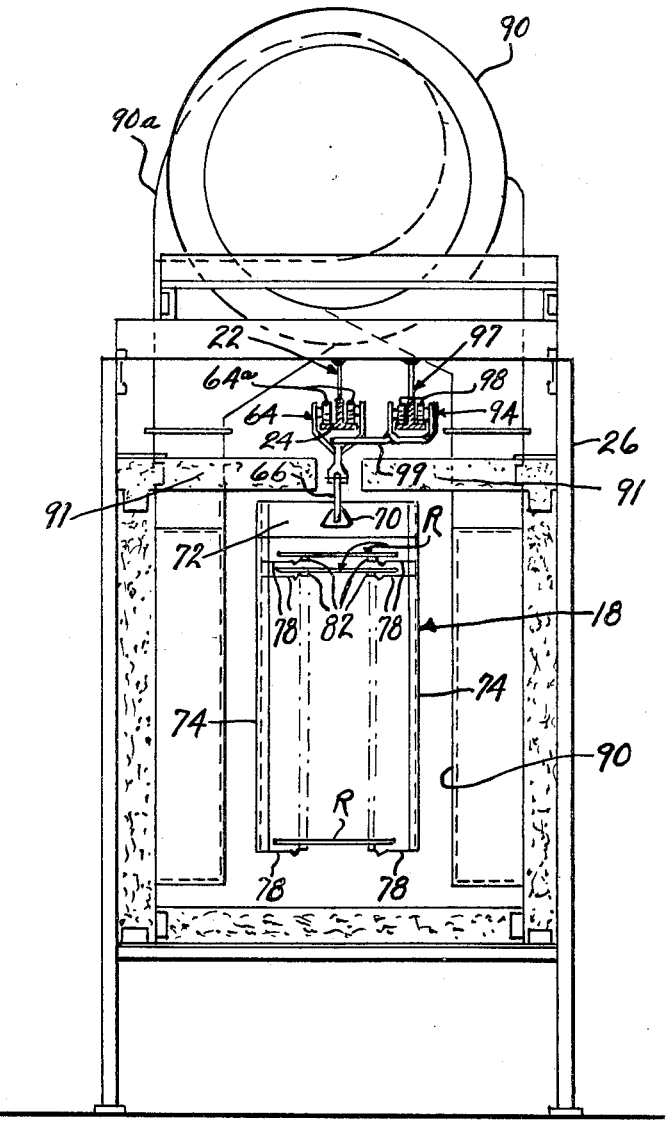

United States Patent Office 3,489,398
Patented Jan. 13, 1970

3,489,398
WELDING ROD HANDLING AND BAKING SYSTEM
Edward M. Hunt, Sagamore Hills, Ohio, assignor to Moslo Machinery Company, Cleveland, Ohio, a corporation of Ohio
Filed June 27, 1968, Ser. No. 740,529
Int. Cl. F27b 9/02, 9/24
U.S. Cl. 263—8                    12 Claims

ABSTRACT OF THE DISCLOSURE

A welding rod handling and baking system comprising a pickup station for the welding rods and wherein conveyor means moves the welding rods into the pickup station, and a vertically movable elevator-type carrier rack mounted on the pickup station straddles the conveyor and moves vertically to pickup a plurality of series of welding rods, and supports the rods in bridging relation across support shelves on the elevator rack. The elevator rack includes a carriage which then is moved onto an overhead conveyor track which carries the elevator rods into an oven wherein the rods are baked. A discharge station similar to the pickup station is preferably provided at the exit end of the oven and whereat the elevator rack is then moved vertically downwardly to deposit the baked rods on a discharge conveyor. The discharge conveyor then moves the baked rods out of the discharge station for further handling. The oven preferably comprises a plurality of heating stages or sections, each of which sections is adapted to be maintained at a predetermined temperature so that the baking temperature to which the welding rods are subjected is progressively increased as the elevator rack is moved through the oven.

---

This invention relates in general to a handling system for an elongated product such as electrodes or welding rods, and more particularly to a welding rod handling and baking system wherein series of the welding rods are progressively picked up at a pickup station from a supply conveyor by a vertically movable carrier rack mechanism, and then are moved into or through an elongated oven mechanism on the carrier rack wherein the rods are baked, and then the rods are progressively discharged from the rack mechanism onto a discharge conveyor at a discharge station, from which station the rods may be conveniently moved by the conveyor to another location for further handling.

Accordingly, an object of the invention is to provide a novel system for mass handling and baking elongated items such as welding rods or electrodes.

Another object of the invention is to provide a system of the above identified type which includes a pickup station for depositing the rods onto a mobile rack for subsequent movement into oven means wherein the baking of the rods occurs, and then providing for removal of the rack and supported rods from the oven means.

A still further object of the invention is to provide a system of the above described type which includes a discharge station for expeditious removal of the baked rods from the mobile rack mechanism onto a discharge conveyor, which discharge conveyor is adapted for moving the rods to another position for further handling.

A still further object of the invention is to provide a system of the latter mentioned type together with a novel construction of pickup and discharge stations and a novel construction of carrier rack mechanism for picking up the rods from the loading conveyor at the pickup station and conveying the rods to the oven and then discharging the rods onto the discharge conveyor mechanism.

Other objects and advantages of the invention will be apparent from the following description taken in conjunction with the accompanying drawings wherein:

FIGURE 1 is a fragmentary generally diagrammatic top plan illustration of the pickup station and portions of the baking oven means and associated conveyor apparatus of the welding rod handling and baking system of the invention;

FIGURE 1A is a fragmentary generally diagrammatic top plan view of the other end of the welding rod baking system illustrating in particular the discharge station and other portions of the baking oven means and associated conveyor apparatus of the system; FIGURES 1 and 1A together illustrate diagrammatically the complete system;

FIGURE 2 is a fragmentary, partially broken side elevational view of the FIGURE 1 illustration;

FIGURE 2A is a fragmentary, partially broken side elevational view of the FIGURE 1A illustration;

FIGURE 3 is an enlarged end elevational view taken generally along the plane of line 3—3 of FIGURE 2, and illustrating the entrance end of the oven in which the welding rods, as supported by the mobile carrier rack structure, are adapted for being baked; a carrier rack with welding rods supported thereon is illustrated in position in one of the oven sections for commencing its progressive movement through the oven during the baking process;

FIGURE 4 is a fragmentary, sectional view taken generally along the plane of line 4—4 of FIGURE 2 looking in the direction of the arrows and illustrating in particular the inner frame of the pickup station which is adapted for movement vertically with respect to the outer frame of the pickup station, and which inner frame supports thereon the elevator carrier rack which in turn is adapted for picking-up the welding rods from the loading conveyor feeding into the pickup station;

FIGURE 5 is a fragmentary sectional view taken generally along the plane of line 5—5 of FIGURE 2 looking in the direction of the arrows and illustrating the carrier rack including the support portion thereof comprising elongated laterally spaced shelves which are adapted to support the ends of the welding rods and lift a series of welding rods from the loading conveyor or deposit the welding rods as carried by the shelves onto the discharge or unloading conveyor associated with the discharge station;

FIGURE 6 is a fragmentary side elevational view of the support means of the carrier rack including the generally central support plate which is adapted to be suspended from carriage means of the carrier rack and the vertically arranged support arms and transversely extending support webs which mount the laterally disposed support shelves, for picking-up and discharging welding rods onto the conveyors associated with repectively the pickup and discharge stations;

FIGURE 7 is a fragmentary, broken, sectional view taken generally along the plane of line 7—7 of FIGURE 6 and illustrating the coaction between the lugs on the central plate of the carrier rack which engage in a respective opening in the associated support web and support the associated vertical support arms and support shelves on the carriage means of the carrier rack; and FIGURE 8 is a diagrammatic, side elevational illustration of respectively the pickup and discharge stations and associated loading and unloading conveyor mechanisms, and illustrating limit switch means associated therewith for providing for automatic operation of said carrier rack in its operation of picking up welding rods at the pickup station and depositing the welding rods at the discharge station after the carrier rack with its load of welding rods has passed through the oven means.

Referring now again to the drawings, there is illustrated a welding rod handling and baking system comprising an elongated endless conveyor 10 power driven as by means of any suitable power means 12 coacting with the conveyor, as for example an electric motor. Conveyor 10 is adapted to receive welding rods or electrodes R in transversely extending relation with respect thereto, as for instance from a chute 14 (FIGURE 2) and move the rods in side-by-side generally juxtapositioned relation on the conveyor 10 into a pickup station 16. Station 16 is adapted to have a vertically movable carrier rack 18 thereat with the vertically movable carrier rack being adapted to straddle conveyor 10 and to automatically pick up groups or series of the welding rods as the rack 18 moves vertically past the conveyor 10 and with respect to the pickup station 16.

The pickup station 16 includes means 20 which is adapted to support the carrier rack and move it vertically with respect to the conveyor 10. A conveyor apparatus 22, which in the embodiment illustrated comprises a single overhead track or rail 24, is adapted to receive the carrier rack after it is fully loaded and to support the loaded carrier rack for movement into an oven 26 where baking of the welding rods or electrodes occurs. After the baking operation on the rods, the carrier rack is adapted to be moved on the conveyor apparatus 22 out of the oven and to a discharge station 28, which is generally similar in structure to the pickup station 16, and which includes means 20' for supporting the loaded carrier rack and moving the rack vertically downwardly wherein the welding rods are automatically deposited on the discharge conveyor mechanism 10', after which the rods are moved by the discharge conveyor mechanism 10' from the discharge station to a position for further handling, such as for instance packaging or the like. Discharge conveyor 10' may have any suitable power means such as for instance 12' coacting therewith for actuating the discharge conveyor mechanism and moving the welding rods on the discharge conveyor mechanism out of the discharge station, and in the direction of the full line arrow of FIG. 2A.

The aforementioned loading conveyor 10 may be an endless belt-type conveyor so that as the welding rods come down off the chute 14, they are received on the top surface of the belt of the conveyor mechanism and as the conveyor mechanism is actuated, the rods are moved forwardly into the pickup station 16. The pickup station 16 in the embodiment illustrated comprises an outer frame or tower 32 disposed over a recess or pit 36 in the floor F. The forward and rearward sides of the tower or outer frame 32 may be of open construction for receiving therethrough the loading conveyor 10 and the mobile carrier racks 18.

Aforementioned means 20 for supporting and moving the carrier rack 18 vertically with respect to the loading conveyor 10 at the pickup station, in the embodiment illustrated, comprises an inner frame 38 (FIG. 4) which may include a top member or portion 38a and leg portions 38b rigidly attached to the top portion 38a and depending therefrom. Wheel means 40 may be provided on the inner frame which wheel means are adapted for rolling coaction with the outer frame 32, for guiding the vertical movement of the inner frame with respect to the outer frame.

The top portion 38a may be suspended on the outer frame 32 by means of longitudinally spaced cables 44 which cables coact with spaced drums 46, 46a mounted on the top of the tower or outer frame 32 of the pickup station. Drums 46, 46a may be positively coupled to one another as by means of a chain and coacting gears 50 (FIG. 1) so that the cable drums will rotate in unison with one another thus insuring maintenance of the horizontal orientation of the top section 38a of vertically movable frame 38. Drum 46 may be coupled as by means of a chain and sprocket drive 52 (FIG. 1) to a speed reducer mechanism 54 of conventional type, with mechanism 54 being suitably coupled as by means of chain and sprocket drive 56 to clutch and electrical motor mechanism 58.

Motor 58 is a reversible motor, and it will be seen therefore that upon actuation of the motor and clutch mechanism 58 in one direction, the inner frame 38 may be moved vertically downwardly and upon actuation of the motor-clutch mechanism 58 in the other direction, the inner frame 38 will be moved in the opposite direction or upwardly, and in generally level condition.

Inner frame 38 supports thereon a preferably centrally disposed elongated track section 60 which, in the embodiment illustrated is of inverted T-shaped configuration. The aforementioned conveyor apparatus 22 likewise is of a single inverted T-shaped track 24 and with such conveyor apparatus 22 being broken or separated at the pickup station so that when the inner frame 38 is in its uppermost raised position, the track section 60 mates with the single track 24 of conveyor mechanism 22, and provides a continuous track for movement of the carrier rack 18 from the track section 60 onto the track 24 of the conveyor apparatus 22.

The carrier rack 18, in the embodiment illustrated, comprises carriage means 64 (FIGS. 2 and 3) including rollers 64a which are adapted to coact with the track section 60 when the rack is disposed in the pickup station. Suspended from the carriage means 64 of the carrier rack is support means comprising, in the embodiment illustrated, a central generally vertically oriented longitudinally extending support plate 66. Support plate 66, as can be best seen in FIGURE 6, has a plurality of lugs 68 on its lower edge spaced lengthwise along the plate 66 and formed by cut-out portions of the plate. Lugs 68 are adapted to be removably received in a respective opening 70 of generally triangular-shape configuration, formed in transversely extending support plates or webs 72 of the elevator rack. Webs 72 on opposite ends thereof support vertically oriented support arms 74 which support arms in turn mount generally horizontally arranged longitudinally extending welding rod support shelves 78.

With such an arrangement, and as can be best seen, for instance in FIGURE 5, the support shelves are disposed in paired laterally spaced relation on opposite sides of the carrier rack with the shelves being so spaced so as to be able to straddle the loading conveyor 10. The ends of the welding rods R supported on the conveyor 10 extend transversely and laterally beyond the vertical side planes of the conveyor, and as the carrier rack is moved vertically upwardly, the laterally disposed shelves will pick up a series of rods from the loading conveyor 10 and support the rods in bridging relation across each pair of horizontally aligned support shelves 78. After one pair of shelves are loaded with a series of welding rods, the movement of the belt of the loading conveyor may present another series of welding rods for pickup by the next pair of underlying shelves on the carrier rack. This loading operation will continue until all of the pairs of shelves on the elevator rack support welding rods thereon in bridging relation thereacross.

As can be best seen from FIGURE 7, the support shelves are preferably crimped or beveled as at 80, lengthwise of the respective shelf, for strengthening the associated shelf. Also, the inner side edge of each of the shelves is preferably provided with a pad 82 of some heat resistant material, such as asbestos, for supporting the ends of the welding rods R thereon, so that heat is not transmitted out of the rods to the support shelves, but instead the rods are heat insulated conductivewise from the generally heat conducting support shelves 78.

The aforementioned pit or recess 36 in the floor provides for movement of the uppermost pair of support shelves below the plane of the top surface of the loading conveyor 10, so that all of the pairs of support shelves can be located with transversely extending rods bridging thereacross. At the completion of the loading of the carrier rack by moving it stepwise vertically with respect to outer frame 32, the carrier rack is then positioned at a raised position wherein the track section 60 mates with the conveyor track 24 of conveyor apparatus 22, at which time the loaded carrier rack is in position for moving out of the pickup station and toward the oven 26 for baking of the rods.

The oven 26 is preferably of tunnel-like configuration having an entrance end 86 (FIGURE 2) disposed in confronting relationship to the pickup station 16, and an exit end 88 (FIG. 2A) disposed in confronting relation to the discharge station 28. As can be best seen in FIGURE 3, the loaded carrier rack 18 is adapted for movement through the tunnel-like oven on the overhead track 24 of the conveyor mechanism 22. The carriage mechanism 64 and overhead track of conveyor apparatus 22 are preferably partially insulated from the temperature in the main section 90 of the oven by oven insulating sections 91 and as shown in FIGURE 3.

The oven preferably comprises a plurality of heating sections designated in the embodiment illustrated as sections V, W, X, Y and Z and a cooling section C (FIGS. 1 and 1A). These sections are disposed in juxtaposed relation to provide a continuous oven structure. The welding rods as they move via the carrier racks 18 through the oven are preferably subjected to a progressively increasing temperature in the oven sections. For instance, the section V may be maintained at a temperature of approximately 200° F., while the section W may be maintained at a temperature of approximately 300° F., while section X may be maintained at a temperature of approximately 600° F., and sections Y and Z maintained at temperatures of respectively 800° F. and 1000° F. It will be seen, therefore, that the weding rods are baked at progressively higher temperatures as they move through the oven mechanism. Heating units 90 including blower mechanisms 90a of conventional type (FIGS. 2 and 2A) may be provided for each oven section, for maintaining the temperature in the respective section at the desired value. Suitable controls of conventional type may be provided for automatically controlling the application of the heat from the furnace or heat producing means 90 and the associated blower means, to the respective oven section. The cooling section C at the exit end of the oven may include blower means 92 and exhaust ductwork 96 coupled to suitable exhaust mechanism, for rapidly cooling the welding rods after they have finished baking.

Movement of the elevator rack through the oven is accomplished in the embodiment illustrated, by an endless pusher conveyor mechanism 94 (FIGURES 1A and 3) which conveyor mechanism 94 may comprise an endless member such as a chain entrained about longitudinally spaced drive sprocket means 96a and including an endless track 97 on which are mounted a series of wheeled trucks 98 having laterally extending pusher arms 99 attached thereto. Trucks 98 may be coupled to one another by means of the aforementionad chain or the like, for causing continuous movement of the coupled trucks 98 on the supporting trackway 97. It will be seen that the pusher conveyor mechanism 94 is disposed inside the oven and at substantially the same level as conveyor mechanism 22.

As operation of the conveyor mechanism 94 occurs, the trucks 98 moving on the supporting trackway 97 of the pusher conveyor automatically move the arms 99 on the trucks into pushing engagement with the carriage mechanism 64 of a respective carrier rack 18, thus pushing the loaded rack through the oven. As the carrier rack exits from the oven, the associated truck 98 of the pusher conveyor follows its curved track 97 and thus automatically disengages from the carriage of the carrier rack, and thus permits the elevator rack to be properly positioned in the discharge station 28 prior to unloading of the baked welding rods from the carrier rack.

The discharge station 28 is of a construction generally similar to that of the pickup station and in this connection may comprise an outer frame 32' and means 20' for moving a carrier rack vertically with respect to the discharge station. Means 20' may include an inner frame 38' and supported track section 60' similarly to the structural arrangement of the pickup station, so that when the inner frame 38' is in predetermined raised relation with respect to the outer frame 32' of the discharge station, the track section 60' mates with the overhead track 24 of conveyor apparatus 22. When the carriage means 64 of a loaded carrier rack is positioned on the track section 60' of the discharge station 28, the means 20' is lowered by proper operation of the motor and clutch mechanism 58', thus lowering the carrier rack past the planes of the sides of the discharge conveyor 10'. Since the baked welding rods are disposed in bridging relation across the laterally disposed shelves 78 on the elevator rack, as each pair of laterally spaced shelves passes through the horizontal plane of the top surface of the discharge conveyor 10', the welding rods supported thereon are deposited on the top surface of the unloading conveyor 10'. Operation of the unloading conveyor moves the welding rods away from the discharge station to another position for further handling, such as for instance to other conveyor means or to packing stations or the like. The progressive lowering of the carrier rack continues until all of the rods supported by the carrier rack are deposited on the discharge conveyor and conveyed by the latter out of the discharge station. It will be seen that the recess or pit 36' in the floor of the system permits lowering of the elevator rack a sufficient amount so that the uppermost pair of laterally spaced shelves can deposit their load of welding rods onto the top surface of the discharge conveyor 10'. The loading and unloading movement of the carrier racks at respectively the pickup and discharge stations may be controlled manually or automatically.

Referring now to FIGURE 8, there is diagrammatically illustrated the pickup and discharge stations 16 and 28 with various limit switches positioned therewith so as to automatically control the operation of the motor mechanisms 58, 58' at respectively the pickup and discharge stations, for automatically controlling the loading and unloading movement of the carrier racks.

Limit switch 100 is adapted for actuation by the carrier rack carriage after it moves into position at the pickup station to permit starting of the motor mechanism 58 in a manner to lower the support means 20 including the inner frame 38, thereby lowering the carrier rack downwardly until the uppermost pair of shelves 78 on the rack are disposed just below the top surface of the loading conveyor 10. Limit switch 102 may stop the down motion of the carrier rack and provide for reversal of the actuating motor unit 58 so that the carrier rack can move upwardly. Limit switch 103 may be actuated by the welding rods on the moving conveyor 10, and when so actuated may start the up motion of the carrier rack when the loading conveyor is full of welding rods. Limit switch 103 may be actuated by the outermost rod on the loading conveyor. Limit switch 104 may stop the up motion of the carrier rack when a pair of the laterally disposed loaded shelves clear the top of the conveyor, as for instance 1¾" above the top surface of the conveyor. Switch 104 may be actuated by the respective pair of shelves. As aforedescribed, this starting and stopping cycle will repeat itself until all of the paired shelves are loaded, with the last cycle leaving the rack in up motion, and limit switch 105 can stop the up motion of the carrier rack when the track section 60 mates with the track 24 of conveyor apparatus 22, and conditions the drive motor 58 for the next carrier rack to start down when it is rolled into proper position in the pickup station.

Referring now to the unloading discharge station 28 in FIG. 8, the limit switch 101′ as actuated by the carrier rack may start the down motion of the carrier rack, and limit switch 102′ may stop the down motion of the carrier rack when the lowermost pair of shelves are disposed in unloading position, or in other words, just slightly below the top surface of the unloading conveyor 10′. Limit switch 103′ may restart the down motion of the carrier rack when the underlying portion of the unloading conveyor 10′ is clear of rods so that the next pair of shelves can be unloaded. This cycle repeats itself till all of the shelves are unloaded by the unloading conveyor. Limit switch 104′ is adapted to stop the down motion of the carrier rack and reverses the actuating motor 58′ to start the rack in its up direction, and limit switch 105′ can stop the upward movement of the carrier rack when the track section 60′ mates with the track 24 of conveyor apparatus 22 and conditions the motor 58′ for lowering the next carrier rack when the latter is rolled into proper position in the discharge station. The motors 58, 58′ may have integral braking apparatus associated therewith for generally instantaneously stopping the respective motor upon proper actuation of the control switches.

From the foregoing discussion and accompanying drawings it will be seen that the invention provides a novel system for handling and baking welding rods or the like, and which includes a pickup station for picking up a series of welding rods on an elevator-like carrier rack and then moving the rack longitudinally into an oven wherein the rods are baked and then removing the rack are baked rods from the open and discharging the rods from the vertically movable carrier rack.

The terms and expressions which have been used are used as terms of description and not of limitation and there is no intention, in the use of such terms and expressions, of excluding any equivalents of any of the features shown or described, or portions thereof, and it is recognized that various modifications are possible.

What is claimed is:

1. In a welding rod baking system comprising, a pickup station, means for moving welding rods adapted for baking into said pickup station, a carrier rack adapted for disposal at said station for picking up the rods from said means, said station including means for moving said carrier rack vertically with respect to said station, conveyor apparatus adapted for coaction with said rack for moving said carrier rack from said pickup station, and oven means coacting with said conveyor apparatus and adapted to receive said carrier rack therein for baking said welding rods.

2. A system in accordance with claim 1 wherein said oven means comprises an elongated tunnel-like arrangement having an entrance at one end and an exit at the other end thereof, said conveyor apparatus coacting with said oven means to move said rack progressively through said oven means and from said entrance end to said exit end.

3. A system in accordance with claim 1 including a discharge station downstream from said oven means, said conveyor apparatus coacting with said discharge station for moving said carrier rack into said discharge station, said discharge station including means for moving said carrier rack vertically with respect to said discharge station, and means coacting with said discharge station for removing the baked welding rods from said carrier rack at said discharge station.

4. A system in accordance with claim 3, wherein each of said stations comprises a tower including an outer frame, said means for moving said carrier rack vertically comprising an inner frame movable vertically with respect to said outer frame, power means coacting between said inner and outer frames for moving said inner frame vertically, means coacting between said frames for guiding the vertical movement of said inner frame with respect to said outer frame, and means supported on said inner frame for mounting said carrier rack thereon, the last mentioned mounting means comprising a track section adapted to mate with said conveyor apparatus in a predetermined raised position of said inner frame for transference of the carrier rack from said mounting means on said inner frame to said conveyor apparatus.

5. A system in accordance with claim 4, wherein said carrier rack comprises carriage means for moving said rack longitudinally onto and from said mounting means of said inner frame, support means suspended from said carriage means, said support means including laterally spaced support arms extending generally vertically and elongated generally horizontally oriented shelves extending longitudinally in the direction of movement of said carrier rack and spaced laterally with respect to one another for engaging the ends of said welding rods and lifting them off the first mentioned means.

6. A system in accordance with claim 4, wherein said oven means includes a plurality of heating sections in which the temperature in each of the heating sections is adapted to be maintained at a value different from the temperature in the other sections for progressively increasing the baking temperature of the welding rods as the latter are moved through said oven means on said carrier rack; and including a cooling section for cooling the welding rods prior to movement of the carrier rack out of said oven means.

7. A system in accordance with claim 5, wherein said support means comprises a central longitudinally extending plate including longitudinally spaced lug means thereon coacting in apertures in transversely extending webs coupled to said support arms for detachably coupling said support arms and said shelves to said central plate.

8. A system in accordance with claim 5, wherein said conveyor apparatus includes an elongated overhead track which passes through said oven means and on which said carriage means is adapted to move, and drive means running generally parallel to said track and adapted for coaction with said carriage means of said carrier rack for moving the carrier rack through said oven means, after which said drive means disengages from said carriage means for permitting discharge of said welding rods from said carrier rack at said discharge station.

9. A system in accordance with claim 1, wherein said pickup station comprises a tower disposed upstream from said oven means, said means on said station for moving said rack vertically comprising a vertically movable frame coacting in guided relation with said tower during vertical movement of said frame with respect to said tower, and generally horizontally oriented track means mounted to said frame, said conveyor apparatus including track means, said track means on said frame adapted for mating coaction with said track means of said conveyor apparatus in a predetermined raised position of said frame, and said rack including carriage means mounted on said track means on said frame and adapted for moving said rack longitudinally onto said track means of said conveyor apparatus after vertical movement of said frame and supported rack to said predetermined raised position with respect to said tower.

10. A system in accordance with claim 9, wherein said carrier rack includes laterally spaced shelves thereon, the lateral distance between said shelves being less than the length of the welding rods, said shelves being adapted to move upwardly beneath the welding rods upon upward movement of said rack and pick up a series of rods from the first mentioned means for supporting the rods on said rack.

11. A system in accordance with claim 10, wherein said first mentioned means comprises an endless conveyor, adapted to support welding rods in transversely extending relationship thereto with the ends of the rods projecting beyond the sides of said conveyor, said rack being adapted to straddle said conveyor with said shelves being disposed on opposite sides of said conveyor during vertical movement with respect thereto, to pick up welding rods from said conveyor.

12. A system in accordance with claim 11, wherein said shelves adjacent their inner side edges which are disposed in confronting relation to the vertical planes of the sides of said conveyor include lengthwise extending pad means for supporting the ends of the welding rods.

References Cited

UNITED STATES PATENTS

| 2,296,361 | 9/1942 | Mayer | 263—10 |
| 2,841,925 | 7/1958 | McMaster | 263—8 X |
| 3,192,645 | 7/1965 | Oetjen et al. | 263—8 X |

JOHN J. CAMBY, Primary Examiner

U.S. Cl. X.R.

34—201